United States Patent [19]

Foley et al.

[11] Patent Number: 4,474,150

[45] Date of Patent: Oct. 2, 1984

[54] VALVE ASSEMBLY

[75] Inventors: Kevin M. Foley, Rochester; Donald D. Stoltman, Henrietta, both of N.Y.

[73] Assignee: General Motors Corporation, Detroit, Mich.

[21] Appl. No.: 443,528

[22] Filed: Nov. 22, 1982

[51] Int. Cl.³ .............................................. F02D 9/08
[52] U.S. Cl. ...................................... 123/337; 261/65
[58] Field of Search ............... 123/337, 403, 336, 391, 123/401; 261/65

[56] References Cited

U.S. PATENT DOCUMENTS

| 2,200,065 | 5/1940 | Jennings, Jr. | 137/153 |
| 2,389,201 | 11/1945 | Lawrenz | 409/143 |
| 4,192,271 | 3/1980 | Peters et al. | 261/44 A |
| 4,391,247 | 7/1983 | Shioyama et al. | 123/403 |

FOREIGN PATENT DOCUMENTS

| 2427995 | 1/1976 | Fed. Rep. of Germany . |
| 2805091 | 8/1979 | Fed. Rep. of Germany . |
| 879874 | 3/1943 | France . |
| 2107657 | 5/1972 | France . |
| 9694 | of 1914 | United Kingdom . |
| 460377 | 1/1937 | United Kingdom . |
| 2048135 | 12/1980 | United Kingdom . |
| 2062182 | 5/1981 | United Kingdom . |
| 2099511 | 12/1982 | United Kingdom . |

Primary Examiner—William A. Cuchlinski, Jr.
Attorney, Agent, or Firm—C. K. Veenstra

[57] ABSTRACT

Induction air flow to an internal combustion engine is controlled or measured by a butterfly valve which extends into undercut recesses on opposite sides of the valve bore. The valve member rotates in excess of 90° between its minimum air flow position and its maximum air flow position and offers a relatively low normalized change in the flow area around the valve.

6 Claims, 4 Drawing Figures

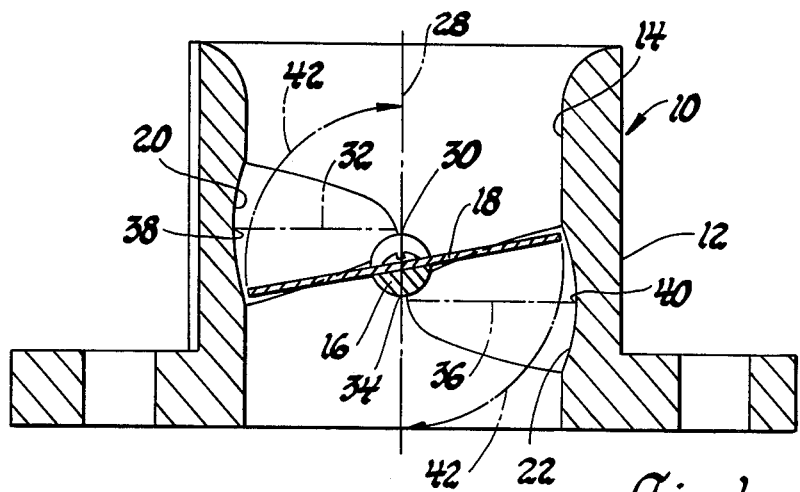
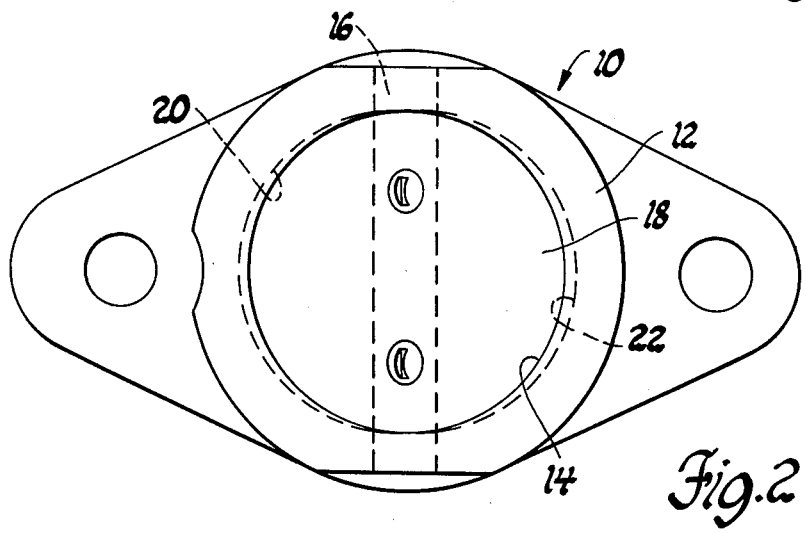
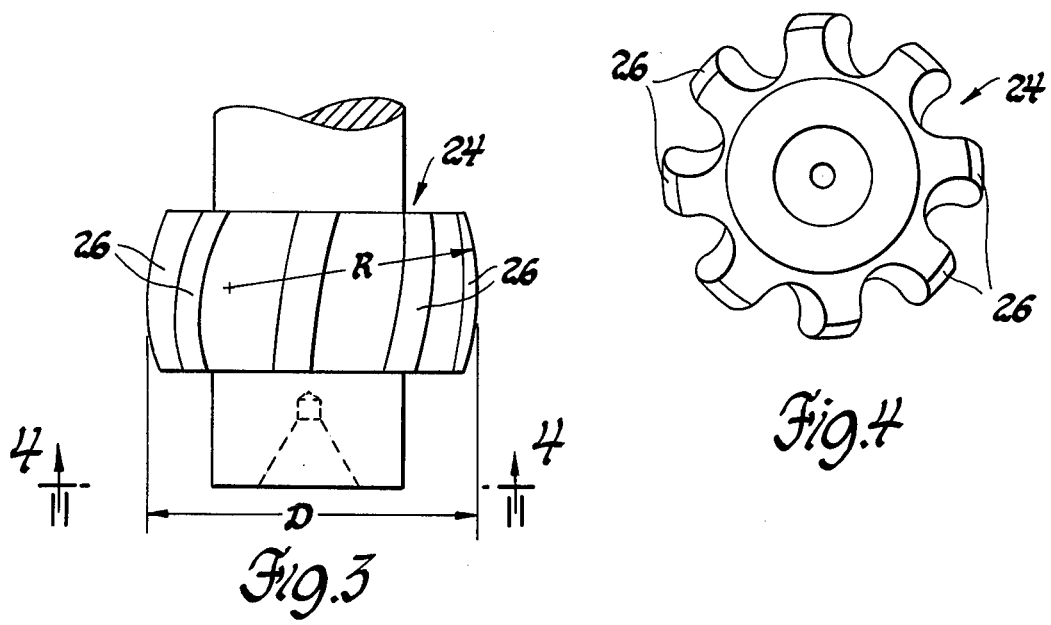

VALVE ASSEMBLY

TECHNICAL FIELD

This invention relates to a valve assembly for determining air flow to an internal combustion engine and to a method of machining a valve bore for such a valve assembly.

BACKGROUND

Electronic control of an automotive internal combustion engine frequently requires measurement or calculation of the air flow to the engine. For many engines, such air flow is determined by a rotatable valve disposed in the engine air induction passage. In some applications the valve is a throttle valve which is positioned by an operator to determine or control air flow to the engine. In other applications the valve is an air valve the position of which is regulated to determine or measure air flow to the engine. With either type of valve, air flow to the engine varies as a function of the air flow area around the valve and the pressure difference across the valve.

Because the air flow area around such a valve is geometrically related to the position of the valve, valve position is often sensed as a basis for measuring or calculating air flow to the engine. In a conventional induction air flow valve assembly, however, the change in the air flow area around the valve for a selected rotation of the valve is much greater when the valve is near its minimum air flow position than when the valve is near its maximum air flow position, and calibration of the valve position sensor is thereby complicated. Structures which would offer a relatively low normalized change in the air flow area around the valve have required manufacturing techniques which, at least in some cases, have not been compatible with the flat butterfly valve conventionally used to determine air flow to internal combustion engines.

SUMMARY OF THE INVENTION

This invention has provided a valve assembly which offers a relatively low normalized change in the air flow area around a flat butterfly valve and which may be simply manufactured.

In a valve assembly according to this invention, a flat butterfly valve is disposed on a shaft in a circular induction passage bore which has undercut recesses on opposite sides of the valve shaft. Each of the recesses has a radius in a plane perpendicular to the axis of the bore substantially equal to the radius of the bore, and each of the recesses has a radius in a plane through the axis of the bore exceeding the radius of the bore. One of the recesses has its deepest portion slightly upstream of the valve shaft, and the other of the recesses has its deepest portion slightly downstream of the valve shaft. With this contruction, the valve rotates in excess of 90° between the position providing the minimum air flow area around the valve and the position providing the maximum air flow area around the valve, and the valve assembly offers a relatively low normalized change in the air flow area around the valve. The valve determines air flow through the bore to the engine and may be used either as a throttle valve to control air flow to the engine or as an air valve to measure air flow to the engine.

The details as well as other features and advantages of the preferred embodiment of this invention are set forth in the remainder of the specification and are shown in the accompanying drawing.

SUMMARY OF THE DRAWING

FIG. 1 is a sectional elevational view of a valve assembly made according to this invention showing the relationship of the valve and the undercut recesses in the valve bore;

FIG. 2 is a top plan view of the FIG. 1 assembly showing the undercut recesses with broken lines;

FIG. 3 is an elevational view of a tool employed to machine the bore; and

FIG. 4 is an end view of the tool shown in FIG. 3.

THE PREFERRED EMBODIMENT

Referring to the drawing, a valve assembly 10 includes a valve body 12 having a circular bore 14 forming an induction passage for air flow to an internal combustion engine. A valve shaft 16 is mounted in body 12 and extends diametrically across bore 14. A flat butterfly valve 18 is secured to shaft 16. Valve 18 has a generally oblong peripheral configuration preferably defined by the intersection of a right circular cylinder and an oblique plane. Rotation of valve 18 and shaft 16 varies the air flow area around valve 18 to determine the air flow through bore 14.

Undercut recesses 20 and 22 are formed in bore 14 on opposite sides of shaft 16. Recesses 20 and 22 are formed by a machining tool 24 having a diameter D equal to the diameter of bore 14 and including a plurality of arcuate cutting edges 26 having a radius of curvature R exceeding the radius of bore 14. Machining tool 24 is inserted in bore 14 along the axis 28 and, at a location 30 along axis 28, is traversed laterally along a line 32 toward one side of bore 14 to form recess 20. At another location 34 along axis 28, machining tool 24 is traversed laterally along a line 36 toward the opposite side of bore 14 to machine recess 22.

Machining tool 24 thus forms undercut recesses 20 and 22 on opposite sides of shaft 16 with the deepest portion 38 of recess 20 being slightly upstream of shaft 16 and with the deepest portion 40 of recess 22 being slightly downstream of shaft 16. The radius of recesses 20 and 22 in a plane perpendicular to axis 28 is substantially equal to the radius of bore 14, and the radius of recesses 20 and 22 in a plane through axis 28 exceeds the radius of bore 14.

Valve 18 extends into recesses 20 and 22 as shown in FIG. 1 to establish the minimum air flow area around valve 18. As shown by the arcuate arrows 42, valve 18 rotates in excess of 90°, and preferably up to 105°–120°, between the position providing the minimum air flow area around valve 18 and the position providing the maximum air flow area around valve 18.

With this contruction, rotation of shaft 16 and valve 18 offers a relatively low normalized change in the air flow area around valve 18. The normalized change in the air flow area around valve 18 may be expressed as $dA/Ad\theta$, where A represents the air flow area around valve 18, $dA$ represents the change in the air flow area around valve 18, and $d\theta$ represents the rotation or change in position of shaft 16 and valve 18. We believe $dA/Ad\theta$ should be less than 0.06, and with this construction we have limited $dA/Ad\theta$ to no more than 0.048. We believe that $dA/Ad\theta$ could be optimized at a maximum of about 0.038.

As noted above, valve 18 may be employed as an operator positioned throttle valve to control air flow through induction passage 14. In other applications, valve 18 may be employed as an air valve which is positioned to maintain a constant pressure difference across the valve and thereby provide a measure of the air flow through induction passage 14. In either application, the relatively low normalized change in the air flow area around valve 18 will permit simplified calibration of a valve position sensor intended for use in an electronic engine control system.

As shown in FIGS. 1-2, shaft 16 extends diametrically across bore 14. In some applications, however, the valve shaft does not extend diametrically across the valve bore but instead is offset toward one side of the bore. Such a structure requires flats on the edges of the valve adjacent the ends of the shaft to prevent binding of the valve in the bore, and the resulting gap between the flattened edges of the valve and the valve bore provides an air flow path which varies the relationship between the air flow area around the valve and the position of the valve. The diameter of the valve shaft may be enlarged to at least partially fill the gap, and it should be appreciated that the additional air flow area of recesses 20 and 22 included in our construction allows enlargement of valve shaft 16 to fill such a gap without restricting the maximum flow area of bore 14.

The embodiments of the invention in which an exclusive property or privilege is claimed are defined as follows:

1. A valve assembly for determining air flow to an internal combustion engine, said assembly comprising a valve body having a bore forming an induction passage for air flow to the engine, said bore having a generally circular cross section, a rotatable valve shaft extending across said bore, and a flat butterfly valve member secured to said shaft, said valve member having a peripheral configuration substantially defined by the intersection of a right circular cylinder and an oblique plane, said valve member being rotatable with said shaft for varying the air flow area about said valve member to determine the air flow through said bore, wherein said bore has undercut recesses on opposite sides of said shaft, each of said recesses having a radius in a plane perpendicular to the axis of said bore substantially equal to the radius of said bore, each of said recesses having a radius in a plane through the axis of said bore exceeding the radius of said bore, one of said recesses having its deepest portion slightly upstream of said shaft and the other of said recesses having its deepest portion slightly downstream of said shaft, wherein said valve member extends into said recesses to establish the minimum air flow area around said valve member, and wherein said valve member rotates in excess of 90° between the position providing the minimum air flow area around said valve member and the position providing the maximum air flow area around said valve member, whereby said valve member offers a relatively low normalized change in the air flow area around said valve member.

2. The valve assembly of claim 1 wherein the portions of said bore upstream and downstream of said shaft are concentric.

3. A throttle valve assembly for controlling air flow to an internal combustion engine, said assembly comprising a throttle body having a bore forming an induction passage for air flow to the engine, said bore having a generally circular cross section, a rotatable valve shaft extending across said bore, and a flat butterfly throttle valve member secured to said shaft, said valve member having a peripheral configuration substantially defined by the intersection of a right circular cylinder and an oblique plane, said valve member being rotatable with said shaft for varying the air flow area about said valve member to control the air flow through said bore, wherein said bore has undercut recesses on opposite sides of said shaft, each of said recesses having a radius in a plane perpendicular to the axis of said bore substantially equal to the radius of said bore, each of said recesses having a radius in a plane through the axis of said bore exceeding the radius of said bore, one of said recesses having its deepest portion slightly upstream of said shaft and the other of said recesses having its deepest portion slightly downstream of said shaft, wherein said valve member extends into said recesses to establish the minimum air flow area around said valve member, and wherein said valve member rotates in excess of 90° between the position providing the minimum air flow area around said valve member and the position providing the maximum air flow area around said valve member, whereby said valve member offers a relatively low normalized change in the air flow area around said valve member.

4. The valve assembly of claim 3 wherein the portions of said bore upstream and downstream of said shaft are concentric.

5. An air valve assembly for measuring air flow to an internal combustion engine, said assembly comprising a valve body having a bore forming an induction passage for air flow to the engine, said bore having a generally circular cross section, a rotatable valve shaft extending across said bore, and a flat butterfly air valve member secured to said shaft, said valve member having a peripheral configuration substantially defined by the intersection of a right circular cylinder and an oblique plane, said valve member being rotatable with said shaft for varying the air flow area about said valve member to measure the air flow through said bore, wherein said bore has undercut recesses on opposite sides of said shaft, each of said recesses having a radius in a plane perpendicular to the axis of said bore substantially equal to the radius of said bore, each of said recesses having a radius in a plane through the axis of said bore exceeding the radius of said bore, one of said recesses having its deepest portion slightly upstream of said shaft and the other of said recesses having its deepest portion slightly downstream of said shaft, wherein said valve member extends into said recesses to establish the minimum air flow area around said valve member, and wherein said valve member rotates in excess of 90° between the position providing the minimum air flow area around said valve member and the position providing the maximum air flow area around said valve member, whereby said valve member offers a relatively low normalized change in the air flow area around said valve member.

6. The valve assembly of claim 5 wherein the portions of said bore upstream and downstream of said shaft are concentric.

* * * * *